(12) United States Patent
Arnoldson et al.

(10) Patent No.: US 12,171,205 B2
(45) Date of Patent: Dec. 24, 2024

(54) SYSTEM AND METHOD FOR ATTRACTING CRUSTACEANS AND OTHER AQUATIC LIFE

(71) Applicant: SPFM, L.P., San Antonio, TX (US)

(72) Inventors: Erick Oscar Jorge Arnoldson, San Antonio, TX (US); Basil Battah, San Antonio, TX (US)

(73) Assignee: SPFM, L.P., San Antonio, TX (US)

( * ) Notice: Subject to any disclaimer, the term of this patent is extended or adjusted under 35 U.S.C. 154(b) by 0 days.

(21) Appl. No.: 18/483,900

(22) Filed: Oct. 10, 2023

(65) Prior Publication Data
US 2024/0032519 A1 Feb. 1, 2024

Related U.S. Application Data

(63) Continuation of application No. 16/785,358, filed on Feb. 7, 2020, now Pat. No. 11,778,996.

(60) Provisional application No. 62/803,042, filed on Feb. 8, 2019.

(51) Int. Cl.
*A01K 69/06* (2006.01)
*G06F 3/16* (2006.01)
*H04R 1/02* (2006.01)

(52) U.S. Cl.
CPC .............. *A01K 69/06* (2013.01); *G06F 3/165* (2013.01); *H04R 1/028* (2013.01)

(58) Field of Classification Search
None
See application file for complete search history.

(56) References Cited

U.S. PATENT DOCUMENTS

| 4,805,339 A | 2/1989 | Fuentes et al. |
| 5,331,760 A | 7/1994 | DuMont |
| 7,263,033 B2 | 8/2007 | Borsina et al. |
| 2002/0116862 A1 | 8/2002 | McNeil |
| 2003/0019144 A1 | 1/2003 | Thompson |
| 2006/0268664 A1 | 11/2006 | Lewis et al. |

OTHER PUBLICATIONS

International Search Report and Written Opinion of the International Searching Authority dated Apr. 24, 2020, in connection with International Application No. PCT/US2020/017312.

*Primary Examiner* — Duane N Taylor, Jr.

(57) ABSTRACT

A lure for attracting aquatic life comprises a submersible main body portion that defines a watertight interior volume. A removable internal sound cartridge disposed within the interior volume provides a synthetic sound for attracting aquatic life. The removable internal sound cartridge may be exchanged for a second removable internal sound cartridge to provide a second synthetic sound for attracting aquatic life. A speaker operably is coupled to the removable internal sound cartridge and configured to emit the synthetic sound for attracting aquatic life.

18 Claims, 2 Drawing Sheets

SYSTEM AND METHOD FOR ATTRACTING CRUSTACEANS AND OTHER AQUATIC LIFE

CROSS-REFERENCE TO RELATED APPLICATIONS

This application is based on and claims the benefit of patent application Ser. No. 16/785,358 filed on Feb. 7, 2020, now U.S. Pat. No. 11,778,996 issued Oct. 10, 2023, which is based on and claims the benefit of Provisional Application No. 62/803,042 filed on Feb. 8, 2019, the disclosure of which is incorporated by reference herein in its entirety.

BACKGROUND

While there are several examples of systems for attracting aquatic life in the prior art, many are intended for personal use and require that a lure be tethered to a fishing rod or be communicably coupled to some control apparatus. By contrast, the present invention contemplates a self-contained unit specifically designed for larger scale commercial fishing operations.

Certain embodiments of the present invention are designed to attract crustaceans or fish directly towards a sound source emitting synthetic sounds. Such embodiments comprise a portable unit that may be deployed according to a number of configurations.

SUMMARY

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

All illustrations of the drawings are for the purpose of describing selected embodiments of the present invention and are not intended to limit the scope of the present invention.

DETAILED DESCRIPTION

Figure 1:
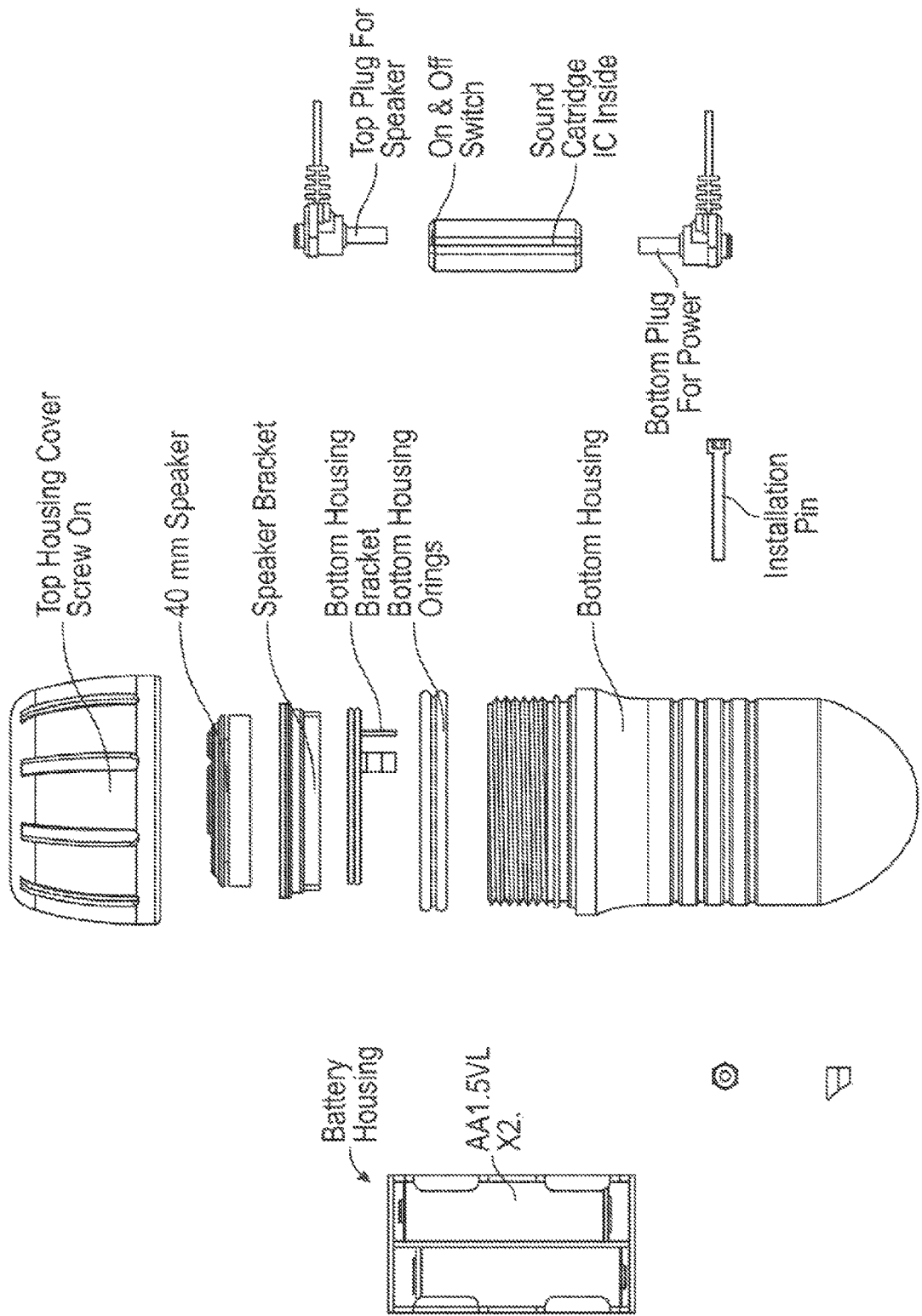
FIG. 1 is an exploded front view of the portable unit of one embodiment of the present invention.
Figure 2:
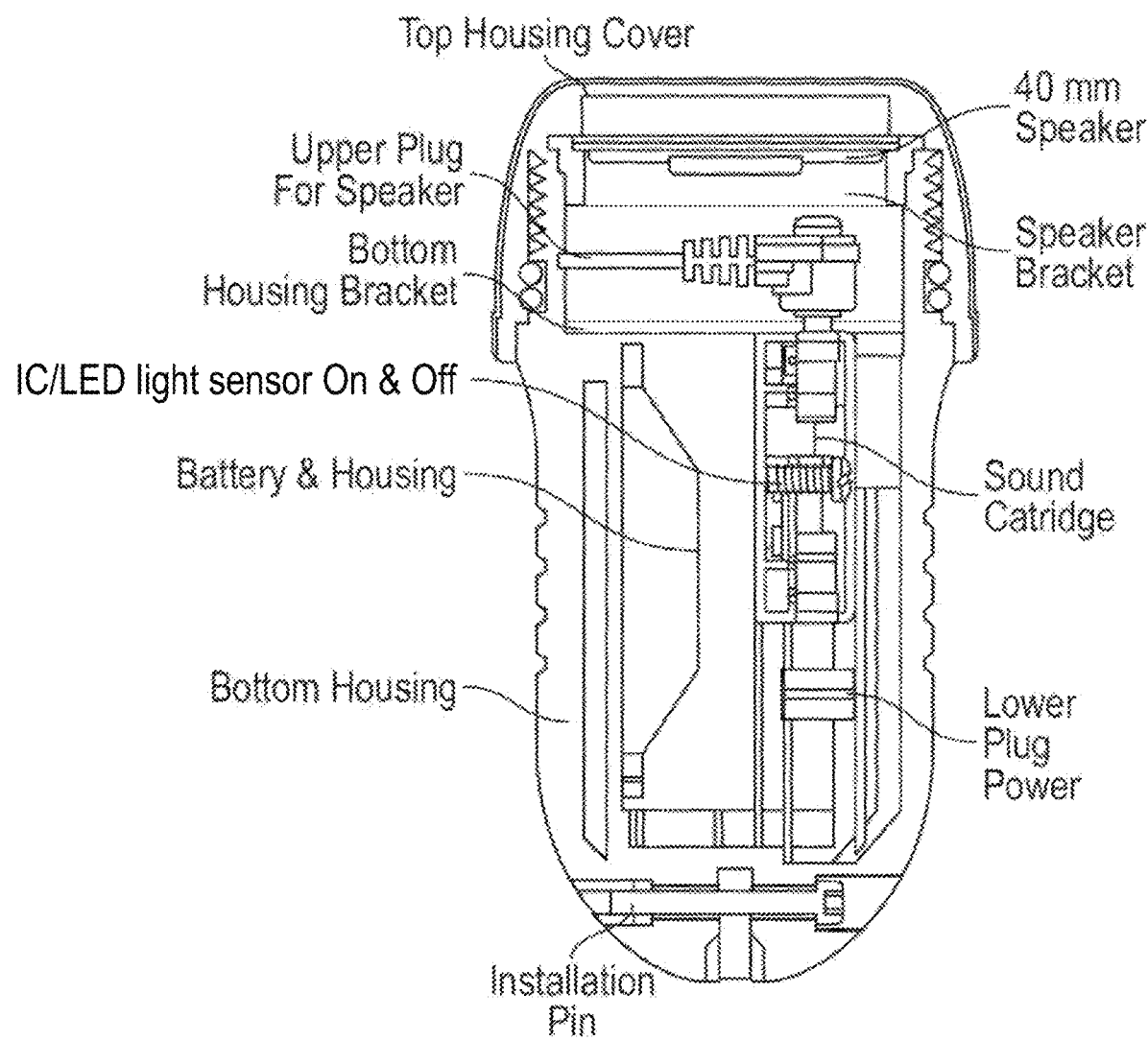
FIG. 2 is a rear sectional view of the portable unit of one embodiment of the present invention.

FIGS. 1 through 2, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

This description as well as FIGS. 1 and 2 depict embodiments of the present invention as they relate to a lure designed for use in commercial fishing.

In one embodiment of the present invention, the lure comprises a portable unit. The portable unit comprises a main body portion. The main body portion may be substantially cylindrical in shape. The main body portion comprises an interior volume into which sound producing components may be disposed. The sound producing components may include sound cartridge configured to cause simulated sounds designed to attract aquatic life to be played through a speaker that is operably coupled to the sound cartridge. The sound cartridge comprises an integrated circuit board or chip. The integrated circuit board may include a microcontroller and memory for storing the simulated sounds. The sound cartridge is further coupled to a power source also disposed within the main body portion.

In further embodiments, the internal, integrated circuit board is a Bluetooth low energy (BLE) board. A light-emitting diode (LED) light sensor may be coupled to the portable unit's internal circuitry. The LED light sensor may be configured to cause a change in the portable unit's power state (on/off) based on the presence or absence of light.

In some embodiments, the portable unit further comprises a removable cap. The removable cap is configured for reversible engagement with the main body portion. In such embodiments, the speaker is internal to the portable unit when the removable cap is engaged with the main body portion. When the removable cap is disengaged from the main body portion, access to the interior volume is granted and the sound cartridge may be removably inserted into the interior volume. Additionally, disengaging the removable cap from the main body portion allows for replacement of the power source. It is envisioned that during typical use of these embodiments of the present invention, a plurality of sound cartridges, each storing a different sound, may be used interchangeably within the portable unit.

In further embodiments, when the removable cap is engaged with the main body portion, a watertight seal is formed to prevent water from entering the interior volume.

In even further embodiments, the speaker may be caused to produce signals that simulate water splashing, the gurgling and moving of waves, and currents or tidal shift against reefs or other geographical features on the ocean floor. The sound cartridge causes the sounds to be played on a loop when the portable unit is powered on.

In certain embodiments, when powered on, the portable unit produces through the speaker low frequency signals, well-known in the art, that emulate a targeted species's acoustical signal that said species emits while feeding. The speaker in this embodiment has an effective attractive radius of 100 meters.

In further embodiments, the portable unit produces low frequency sound pressure, at frequencies well-known in the art, through the speaker and has an effective range of 1,000 meters.

In some embodiments, the power source providing power for the sound producing functionality of the portable unit is two (2) AA LR6 1.5V batteries connected in parallel, and the portable unit has an expected battery life of 400 hours when powered on.

In one embodiment, the main body portion has a length of 111.15 mm, a diameter of 47.68 mm, and a wall thickness of 3 mm. In this embodiment, the main body portion is constructed of ABS 90 (acrylonitrile butadiene styrene). Additionally, the speaker is a 40 mm speaker.

In certain embodiments of the present invention, the portable unit may be configured for placement inside square traps. The portable unit may be attached on the top of a trap or inside bait bags. When these traps are deployed, they may come to rest on the ocean floor or be suspended from a fixed structure. In further embodiments, the portable unit may be deployed in dependent from a trap.

In one embodiment, the portable unit is adapted for use at depths between 38 meters (125 feet (ft.)) and 182 meters (600 ft.).

In some embodiments, the main body portion further comprises an inner housing bracket for supporting its internal components. In these embodiments, the main body portion further comprises a speaker bracket to support and secure the speaker within the portable unit.

Although the present invention has been explained in relation the various embodiments, it is to be understood that many other possible modifications and variations can be made, and would be understood by those persons of ordinary skill in the art, without departing from the spirit and scope of the invention.

Although the present disclosure has been described with various embodiments, various changes and modifications may be suggested to one skilled in the art. It is intended that the present disclosure encompass such changes and modifications as fall within the scope of the appended claims.

What is claimed is:

1. A lure for attracting aquatic life comprising:
a submersible main body portion, wherein the submersible main body portion defines a watertight interior volume;
a removable internal sound cartridge disposed within the watertight interior volume for providing a synthetic sound for attracting aquatic life, wherein the removable internal sound cartridge may be exchanged for a second removable internal sound cartridge to provide a second synthetic sound for attracting the aquatic life; and
a speaker operably coupled to the removable internal sound cartridge and configured to emit the synthetic sound for attracting the aquatic life.

2. The lure of claim 1 further including a light-emitting diode (LED) light sensor for actuating the removable internal sound cartridge from an off state to an on state responsive to detection of an absence of light.

3. The lure of claim 1, wherein the removable internal sound cartridge further comprises:
a first connector for connecting the removable internal sound cartridge to the speaker; and
a second connector for connecting the removable internal sound cartridge to a power source.

4. The lure of claim 1, wherein the removable internal sound cartridge comprises at least one of an integrated circuit board and a chip.

5. The lure of claim 1, wherein the removable internal sound cartridge comprise:
a memory having stored thereon the synthetic sound for attracting the aquatic life; and
a microcontroller for controlling operation of the removable internal sound cartridge.

6. The lure of claim 1, wherein the removable internal sound cartridge causes sound to be played on a loop.

7. The lure of claim 1, wherein the synthetic sound for attracting the aquatic life comprises one of: a simulated water splashing sound, a simulated sound of wave gurgling, a simulated sound of wave movement, a simulated sound of water currents, a simulated sound of tidal shifts on a reef, a simulated sound of water interacting with geographic features on an ocean floor, non-naturally occurring sound waves, low frequency signals that emulate a selected acoustical signal of a feeding species or low frequency sound pressure designed to attract rather than repel the aquatic life.

8. A lure for attracting aquatic life comprising:
a submersible main body portion, wherein the submersible main body portion defines a watertight interior volume;
internal sound circuitry disposed within the watertight interior volume for providing a synthetic sound for attracting aquatic life, wherein the internal sound circuitry may be configured for a second removable internal sound circuitry to provide a second synthetic sound for attracting the aquatic life; and
a speaker operably coupled to the internal sound circuitry and configured to emit the synthetic sound for attracting the aquatic life.

9. The lure of claim 8 further including a light-emitting diode (LED) light sensor for actuating the internal sound circuitry from an off state to an on state responsive to detection of an absence of light.

10. The lure of claim 8, wherein the internal sound circuitry further comprises:
a first connector for connecting the internal sound circuitry to the speaker; and
a second connector for connecting the internal sound circuitry to a power source.

11. The lure of claim 8, wherein the internal sound circuitry comprises at least one of an integrated circuit board and a chip.

12. The lure of claim 8, wherein the internal sound circuitry further comprise:
a memory having stored thereon the synthetic sound for attracting the aquatic life; and a microcontroller for controlling operation of the internal sound circuitry.

13. The lure of claim 8, wherein the internal sound circuitry causes sound to be played on a loop.

14. The lure of claim 8, wherein the synthetic sound for attracting the aquatic life comprises one of: a simulated water splashing sound, a simulated sound of wave gurgling, a simulated sound of wave movement, a simulated sound of water currents, a simulated sound of tidal shifts on a reef, a simulated sound of water interacting with geographic features on an ocean floor, non-naturally occurring sound waves, low frequency signals that emulate a selected acoustical signal of a feeding species or low frequency sound pressure designed to attract rather than repel the aquatic life.

15. A lure for attracting aquatic life comprising:
   a submersible main body portion, wherein the submersible main body portion defines a watertight interior volume;
   internal sound circuitry disposed within the watertight interior volume for providing at least one synthetic sound for attracting aquatic life, wherein the internal sound circuitry further comprises:
      a memory having stored thereon the at least one synthetic sound for attracting the aquatic life; and
      a microcontroller for controlling operation of the internal sound circuitry;
   a light-emitting diode (LED) light sensor for actuating the internal sound circuitry from an off state to an on state responsive to detection of an absence of light; and
   a speaker operably coupled to the internal sound circuitry and configured to emit the at least one synthetic sound for attracting the aquatic life.

16. The lure of claim 15, wherein the at least one synthetic sound for attracting the aquatic life comprises one of: a simulated water splashing sound, a simulated sound of wave gurgling, a simulated sound of wave movement, a simulated sound of water currents, a simulated sound of tidal shifts on a reef, a simulated sound of water interacting with geographic features on an ocean floor, non-naturally occurring sound waves, low frequency signals that emulate a selected acoustical signal of a feeding species or low frequency sound pressure designed to attract rather than repel the aquatic life.

17. The lure of claim 15, wherein the internal sound circuitry causes sound to be played on a loop.

18. A lure for attracting aquatic life comprising:
   a submersible main body portion, wherein the submersible main body portion defines a watertight interior volume;
   internal sound circuitry disposed within the watertight interior volume for providing a synthetic sound for attracting aquatic life;
   a light-emitting diode (LED) light sensor for actuating the internal sound circuitry from an off state to an on state responsive to detection of an absence of light; and
   a speaker operably coupled to the internal sound circuitry and configured to emit the synthetic sound for attracting the aquatic life.

* * * * *